United States Patent
Ono

(10) Patent No.: US 7,895,838 B2
(45) Date of Patent: Mar. 1, 2011

(54) EXHAUST GAS RECIRCULATION APPARATUS OF AN INTERNAL COMBUSTION ENGINE AND CONTROL METHOD THEREOF

(75) Inventor: Tomoyuki Ono, Suntou-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 337 days.

(21) Appl. No.: 11/996,388

(22) PCT Filed: Jan. 25, 2007

(86) PCT No.: PCT/IB2007/000170

§ 371 (c)(1),
(2), (4) Date: Jan. 22, 2008

(87) PCT Pub. No.: WO2007/085944

PCT Pub. Date: Aug. 2, 2007

(65) Prior Publication Data

US 2008/0295514 A1    Dec. 4, 2008

(30) Foreign Application Priority Data

Jan. 27, 2006 (JP) .............................. 2006-018554

(51) Int. Cl.
*F02B 33/44* (2006.01)
*F02M 25/07* (2006.01)
*F02M 25/06* (2006.01)
*F01N 3/00* (2006.01)
*F01N 5/04* (2006.01)

(52) U.S. Cl. .................... 60/605.2; 60/278; 60/280; 60/285; 123/568.11

(58) Field of Classification Search ................ 60/605.2, 60/278, 28; 123/568.11, 568.21; F02M 25/07; F02B 37/00; F02D 21/08, 23/00; F01N 3/24, 3/26, F01N 3/02, 3/00
See application file for complete search history.

(56) References Cited

U.S. PATENT DOCUMENTS 6,539,714 B1 *    4/2003    Wang ........................... 60/598

(Continued)

FOREIGN PATENT DOCUMENTS

JP    2-161161 A    6/1990

(Continued)

OTHER PUBLICATIONS

A Fully Certified EnglishTranslation of JP 2002-276405 A is published on Sep. 25, 2002.*

(Continued)

*Primary Examiner* — Thai Ba Trieu
(74) *Attorney, Agent, or Firm* — Sughrue Mion, PLLC

(57) ABSTRACT

An exhaust gas recirculation apparatus of an internal combustion engine includes a turbocharger provided with a turbine in an exhaust passage and a compressor in an intake passage, a low pressure EGR passage which connects the exhaust passage downstream of the turbine with the intake passage upstream of the compressor, a high pressure EGR passage which connects the exhaust passage upstream of the turbine with the intake passage downstream of the compressor; an exhaust gas control catalyst provided in the exhaust passage downstream of the turbine and upstream of the low pressure EGR passage; and EGR gas amount changing device for simultaneously changing amounts of EGR gas flowing through the low pressure EGR passage and the high pressure EGR passage such that a temperature of the exhaust gas control catalyst is within a target range.

20 Claims, 7 Drawing Sheets

U.S. PATENT DOCUMENTS

| | | |
|---|---|---|
| 6,698,203 B2 * 3/2004 | Wang | 60/602 |
| 6,988,365 B2 * 1/2006 | Sasaki | 60/605.2 |
| 7,197,867 B2 * 4/2007 | Huang et al. | 60/280 |
| 7,296,561 B2 * 11/2007 | Shirakawa et al. | 60/605.2 |
| 7,370,644 B2 * 5/2008 | Wang | 60/605.2 |
| 7,533,518 B2 * 5/2009 | Kurtz et al. | 60/285 |
| 7,587,888 B2 * 9/2009 | Shirakawa | 60/605.2 |
| 2004/0050375 A1 3/2004 | Arnold | 60/605.2 |
| 2005/0103014 A1* 5/2005 | Sasaki | 60/605.2 |
| 2007/0204598 A1* 9/2007 | Wirth et al. | 60/278 |
| 2009/0165758 A1* 7/2009 | Nishiumi et al. | 123/568.21 |
| 2009/0223221 A1* 9/2009 | Onishi et al. | 123/568.11 |
| 2009/0277431 A1* 11/2009 | Nitzke et al. | 60/605.2 |
| 2009/0308071 A1* 12/2009 | Yamashita et al. | 60/602 |
| 2010/0000500 A1* 1/2010 | Shimizu et al. | 60/605.2 |
| 2010/0031939 A1* 2/2010 | Ono | 60/605.2 |

FOREIGN PATENT DOCUMENTS

| | | |
|---|---|---|
| JP | 2586218 B2 | 7/1992 |
| JP | 5-156931 A | 6/1993 |
| JP | 7-293347 A | 11/1995 |
| JP | 11-229973 A | 8/1999 |
| JP | 11210449 A * | 8/1999 |
| JP | 2001193522 A * | 8/1999 |
| JP | 11-324661 A | 11/1999 |
| JP | 2001-82134 A | 3/2001 |
| JP | 2001-152830 A | 6/2001 |
| JP | 2001-164999 A | 6/2001 |
| JP | 2002188524 A * | 7/2002 |
| JP | 2002-276405 A | 9/2002 |
| JP | 2003-21002 A | 1/2003 |
| JP | 2003-106137 A | 4/2003 |
| JP | 2004-162674 A | 6/2004 |
| JP | 2005-76456 A | 3/2005 |
| JP | 2005-171765 A | 6/2005 |
| JP | 2005-220761 A | 8/2005 |
| JP | 2006233898 A * | 9/2006 |
| JP | 2007303433 A * | 11/2007 |
| JP | 2008008206 A * | 1/2008 |
| JP | 2008215210 A * | 9/2008 |
| WO | WO 03/102391 A1 | 12/2003 |
| WO | WO 2006/008600 A2 | 1/2006 |

OTHER PUBLICATIONS

A Fully Certified English Translation of JP 2001-082134 A is published on Mar. 27, 2001.*

A Fully Certified English Translation of JP 11-229973 A is published on Aug. 24, 1999.*

A Machine Translation of JP 11-324661 A is published on Nov. 26, 1999.*

A Machine Translation of JP 07-293347 A is published on Nov. 7, 1995.*

* cited by examiner

EXHAUST GAS RECIRCULATION APPARATUS OF AN INTERNAL COMBUSTION ENGINE AND CONTROL METHOD THEREOF

BACKGROUND OF THE INVENTION

1. Field of the Invention

The invention relates to an exhaust gas recirculation apparatus of an internal combustion engine and a control method thereof.

2. Description of the Related Art

Japanese Patent Application Publication No. JP-A-11-229973, for example, describes technology which keeps the temperature of an exhaust gas control catalyst within a predetermined range by having one EGR passage connected downstream of the exhaust gas control catalyst and another EGR passage connected upstream of the exhaust gas control catalyst, and drawing in exhaust gas from the downstream EGR passage when the temperature of the exhaust gas control catalyst is low and drawing in exhaust gas from the upstream EGR passage when the temperature of the exhaust gas control catalyst is high.

Soot and the like tends to adhere to the EGR passages and EGR valves, and a buildup of this soot and the like results in large pressure loss in the EGR passages and changes the flow rate of EGR gas with respect to the opening amounts of the EGR valves. Therefore, at any given opening amount of an EGR valve, the amount of EGR gas recirculated to the intake system ends up being different from what it would otherwise be if no soot were adhered to the EGR passage and EGR valve, which makes it difficult to control the temperature of the exhaust gas control catalyst.

Also, when exhaust gas is drawn in from downstream or upstream of the exhaust gas control catalyst, even if the temperature of the exhaust gas control catalyst is able to be maintained within the predetermined range, the rotation speed of the turbocharger may decrease resulting in slower acceleration of the vehicle.

SUMMARY OF THE INVENTION

This invention provides an exhaust gas recirculation apparatus of an internal combustion engine and control method thereof capable of maintaining the temperature of an exhaust gas control catalyst within a predetermined range.

An exhaust gas recirculation apparatus of an internal combustion engine according to one aspect of the invention employs the following means. That is, an exhaust gas recirculation apparatus of an internal combustion engine according to a first aspect of the invention includes a turbocharger provided with a turbine in an exhaust passage and a compressor in an intake passage, a low pressure EGR passage which connects the exhaust passage downstream of the turbine with the intake passage upstream of the compressor, a high pressure EGR passage which connects the exhaust passage upstream of the turbine with the intake passage downstream of the compressor, an exhaust gas control catalyst provided in the exhaust passage downstream of the turbine and upstream of the low pressure EGR passage, and EGR gas amount changing means for simultaneously changing amounts of EGR gas flowing through the low pressure EGR passage and the high pressure EGR passage such that a temperature of the exhaust gas control catalyst is within a target range.

The target range of the temperature of the exhaust gas control catalyst is, for example, the range of the activation temperature of the exhaust gas control catalyst. Here, upstream of the turbine the pressure of the exhaust gas is high because of the resistance encountered when the exhaust gas flows through the turbine. The temperature of the exhaust gas is also high at this point because the energy of the exhaust gas has not yet been consumed in the turbine. On the other hand, downstream of the turbine the pressure of the exhaust gas is relatively low and the temperature of the exhaust gas is also relatively low.

Also, upstream of the compressor the pressure of the intake air is low because it has not yet been supercharged by the compressor. On the other hand, downstream of the compressor the pressure of the intake air is high because it has been supercharged by the compressor. That is, EGR gas flowing through the low pressure EGR passage has a lower temperature and lower pressure than EGR gas flowing through the high pressure EGR passage.

When EGR gas it to be passed through the high pressure EGR passage, exhaust gas is drawn into the high pressure EGR passage from the exhaust passage so less exhaust gas flows through the exhaust passage downstream of the high pressure EGR passage. That is, there is less energy to rotate the turbine. Further, the amount of exhaust gas flowing through the exhaust gas control catalyst also decreases. Moreover, the amount of EGR gas flowing through the low pressure EGR passage also decreases because less exhaust gas reaches the low pressure EGR passage. These all become more prominent the larger the amount of EGR gas flowing through the high pressure EGR passage.

Increasing the amount of EGR gas flowing through the high pressure EGR passage reduces the amount of fresh air drawn into the internal combustion engine. Thus, during deceleration of the vehicle, for example, the temperature of the exhaust gas from the internal combustion engine decreases, but if the amount of EGR gas flowing through the high pressure EGR passage is increased, the amount of exhaust gas flowing through the exhaust gas control catalyst decreases, which makes it possible to suppress a decrease in temperature of the exhaust gas control catalyst.

Further, reducing the amount of EGR gas flowing through the high pressure EGR passage increases the amount of fresh air drawn into the internal combustion engine. Therefore, the amount of exhaust gas flowing through the exhaust gas control catalyst increases. Also, during deceleration of the vehicle, for example, the temperature of the exhaust gas from the internal combustion engine decreases. Therefore, reducing the amount of EGR gas flowing through the high pressure EGR passage results in more low temperature exhaust gas flowing through the exhaust gas control catalyst. Accordingly, the temperature of the exhaust gas control catalyst can be reduced, thereby making it possible to suppress overheating of the exhaust gas control catalyst.

However, if when attempting to suppress a decrease in temperature of the exhaust gas control catalyst the amount of EGR gas flowing through the high pressure EGR passage is increased too much, the energy that rotates the turbocharger decreases a corresponding amount which results in a slower increase in boost pressure during the next acceleration. On the other hand, if the amount of EGR gas flowing through the low pressure EGR passage is increased, the exhaust gas which has passed through the exhaust gas control catalyst and thus increased in temperature is drawn in as EGR gas. As a result, the temperature of the intake air increases so a decrease in the temperature of the exhaust gas can be suppressed. Accordingly, the temperature of the exhaust gas control catalyst can be maintained. That is, the temperature of the exhaust gas control catalyst can be maintained by simultaneously increasing the amounts of EGR gas flowing through the low pressure EGR passage and the high pressure EGR passage.

Also, according to a second aspect of the invention, in the first aspect, the EGR gas amount changing means simultaneously changes the amounts of EGR gas flowing through the low pressure EGR passage and the high pressure EGR passage to maintain a speed of the turbocharger. Increasing the amount of EGR gas flowing through the low pressure EGR passage increases the amount of exhaust gas that flows through the turbine. As a result, a drop in speed of the turbocharger can be suppressed so the speed of the turbocharger can be kept within the target range. At the same time, having EGR gas pass through the high pressure EGR passage enables the temperature of the exhaust gas control catalyst to be maintained. That is, simultaneously increasing the amounts of EGR gas flowing through the low pressure EGR passage and the high pressure EGR passage enables both the temperature of the exhaust gas control catalyst and the speed of the turbocharger to be maintained. In addition, EGR gas can be supplied while inhibiting a drop in output of the internal combustion engine so the generation of NOx can be suppressed.

According to a third aspect of the invention, in the first or second aspect, when the temperature of the exhaust gas control catalyst is within the target range or below the target range, the amounts of EGR gas flowing through the low pressure EGR passage and the high pressure EGR passage are increased more so than when the temperature of the exhaust gas control catalyst is above the target range. Increasing the amounts of EGR gas flowing through the low pressure EGR passage and the high pressure EGR passage reduces the amount of exhaust gas that flows through the exhaust gas control catalyst. Reducing the amount of exhaust gas that flows through the exhaust gas control catalyst during a fuel cut, for example, enables a drop in temperature of the exhaust gas control catalyst to be suppressed. That is, increasing the amounts of EGR gas flowing through the low pressure EGR passage and the high pressure EGR passage more when the temperature of the exhaust gas control catalyst is within the target range or below the target range than when the temperature of the exhaust gas control catalyst is above the target range not only enables EGR gas of an amount appropriate for maintaining the temperature of the exhaust gas control catalyst to be supplied, but also enables EGR gas of an amount appropriate for maintaining the speed of the turbocharger to be supplied.

Also, according to a fourth aspect of the invention, in any one of the first to third aspects, the more EGR gas is made to flow through the low pressure EGR passage and the high pressure EGR passage the lower the temperature of the exhaust gas control catalyst. Here, the temperature of the exhaust gas control catalyst changes according to the amount of exhaust gas flowing through the exhaust gas control catalyst. That is, changing the amounts of EGR gas flowing through the low pressure EGR passage and the high pressure EGR passage according to the temperature of the exhaust gas control catalyst not only enables EGR gas of an amount more appropriate for maintaining the temperature of the exhaust gas control catalyst to be supplied, but also enables EGR gas of an amount more appropriate for maintaining the speed of the turbocharger to be supplied.

According to a fifth aspect of the invention, in any one of the first to fourth aspects, the exhaust gas recirculation apparatus of an internal combustion engine is also provided with fresh air intake amount measuring means for measuring an amount of fresh air drawn into the internal combustion engine. Moreover, the EGR gas amount changing means includes a low pressure EGR valve which is provided in the low pressure EGR passage and adjusts a passage sectional area of the low pressure EGR passage, and a high pressure EGR valve which is provided in the high pressure EGR passage and adjusts a passage sectional area of the high pressure EGR passage. During deceleration of a vehicle or when the internal combustion engine is idling, the low pressure EGR valve and the high pressure EGR valve are each opened a predetermined amount and at least one relationship, from among a relationship between the amount of EGR gas flowing through the low pressure EGR passage and the opening amount of the low pressure EGR valve and a relationship between the amount of EGR gas flowing through the high pressure EGR passage and the opening amount of the high pressure EGR valve, is learn corrected based on the fresh air intake amount of the internal combustion engine at this time.

Unless there is an abnormality in the low pressure EGR passage, the low pressure EGR valve, the high pressure EGR passage, or the high pressure EGR valve, the amounts of EGR gas flowing through the low pressure EGR passage and the high pressure EGR passage are determined by the operating state of the internal combustion engine and the opening amounts of the low pressure EGR valve and the high pressure EGR valve. Also, the amount of gas drawn into the cylinders of the internal combustion engine is determined by the operating state of the internal combustion engine. This amount of gas drawn into the cylinders is the combined amount of fresh air and EGR gas. Therefore, when EGR gas is supplied to the internal combustion engine, the amount of fresh air drawn into the internal combustion engine is decreased by that amount. That is, there is a correlation between the opening amounts of the low pressure EGR valve and the high pressure EGR valve, and the amount of fresh air that is drawn in. Therefore, the total amount of EGR gas is determined based on the operating state of the internal combustion engine and the amount of fresh air that is drawn in.

However, if soot or the like adheres to the low pressure EGR passage, the low pressure EGR valve, the high pressure EGR passage, or the high pressure EGR valve, the relationship between the opening amounts of the low pressure EGR valve and the high pressure EGR valve, and the amount of EGR gas that is supplied changes. As a result, the relationship between the opening amounts of the low pressure EGR valve and the high pressure EGR valve, and the amount of fresh air that is drawn in also changes.

Regarding this point, when the vehicle is decelerating or the internal combustion engine is idling, the low pressure EGR valve and the high pressure EGR valve both open a predetermined amount. Based on the amount of fresh air drawn into the internal combustion engine at this time, it is then possible to learn correct (i.e., correct through learning) the relationship between the amount of EGR gas flowing through the low pressure EGR passage and the opening amount of the low pressure EGR valve, or the relationship between the amount of EGR gas flowing through the high pressure EGR passage and the opening amount of the high pressure EGR valve. That is, it is possible to separately learn correct the relationship between the amount of EGR gas flowing through the low pressure EGR passage and the opening amount of the low pressure EGR valve, and the relationship between the amount of EGR gas flowing through the high pressure EGR passage and the opening amount of the high pressure EGR valve. Accordingly, the affect from the adhered soot and the like can be reduced. At this time, because the opening amount of one EGR valve affects the amount of EGR gas flowing through the other EGR valve, the opening amount of one EGR valve can be fixed in the fully closed position, while the opening amount of the other EGR valve can be fixed in the fully open position, for example, and this other EGR valve side can be learn corrected. For example, fully closing one EGR valve makes it possible to learn correct the affect of soot or the like in the EGR passage in which the other EGR valve is provided without being effected by the soot or the like in the EGR passage in which the one EGR valve is provided. That is, when setting both the low pressure EGR valve and the high pressure EGR valve to predetermined opening amounts, the low pressure EGR valve and the high pressure EGR valve can be set to different predetermined opening amounts.

According to a sixth aspect of the invention, in the fifth aspect, at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, is learn corrected based on the temperature of the exhaust gas control catalyst. Here, the temperature of the exhaust gas flowing through the exhaust gas control catalyst changes according to the temperature of the exhaust gas control catalyst. Therefore, the volume flowrate of the exhaust gas changes according to the temperature of the exhaust gas control catalyst. As a result, the fresh air intake amount also changes. The learning correction is performed based on this fresh air intake amount so if this amount changes due to some reason other than the adherence of soot or the like, an erroneous correction may be made. With regards to this point, the effect from the temperature of the exhaust gas control catalyst can be cancelled out by learn correcting the relationship between the amount of EGR gas flowing through the low pressure EGR passage and the opening amount of the low pressure EGR valve or the relationship between the amount of EGR gas flowing through the high pressure EGR passage and the opening amount of the high pressure EGR valve, based on the temperature of the exhaust gas control catalyst.

According to a seventh aspect of the invention, in the fifth or sixth aspect, the exhaust gas recirculation apparatus of an internal combustion engine also includes an EGR cooler which is provided in at least one of the low pressure EGR passage and the high pressure EGR passage and reduces the temperature of the EGR gas. Moreover, at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, is learn corrected based on a cooling efficiency of the EGR cooler. Here, the temperature of the EGR gas changes when it passes through the EGR cooler. Therefore, the volume flowrate of the EGR gas changes according to the cooling efficiency of the EGR cooler. As a result, the fresh air intake amount also changes. With regards to this point, the effect from the EGR cooler can be cancelled out by learn correcting the relationship between the amount of EGR gas flowing through the low pressure EGR passage and the opening amount of the low pressure EGR valve or the relationship between the amount of EGR gas flowing through the high pressure EGR passage and the opening amount of the high pressure EGR valve, based on the cooling efficiency of the EGR cooler.

According to an eighth aspect of the invention, in any one of the fifth to seventh aspects, the exhaust gas control catalyst is carried on a particulate filter that temporarily traps particulate matter in the exhaust gas, and at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, is learn corrected based on the amount of particulate matter trapped in the particulate filter. Here, the volume flowrate of the exhaust gas flowing through the particulate filter changes according to the amount of particulate matter trapped in the particulate filter. As a result, the fresh air intake amount also changes. With regards to this point, the effect from particulate matter trapped in the particulate filter can be cancelled out by learn correcting the relationship between the amount of EGR gas flowing through the low pressure EGR passage and the opening amount of the low pressure EGR valve or the relationship between the amount of EGR gas flowing through the high pressure EGR passage and the opening amount of the high pressure EGR valve, based on the amount of particulate matter trapped in the particulate filter.

Also, the learning correction may be prohibited when the amount of particulate matter trapped in the particulate filter is equal to or greater than a predetermined amount. This predetermined amount can be, for example, an amount that requires the filter to be regenerated, or an amount that makes it difficult to learn correct the relationship between the amount of EGR gas flowing through the low pressure EGR passage and the opening amount of the low pressure EGR valve, or the relationship between the amount of EGR gas flowing through the high pressure EGR passage and the opening amount of the high pressure EGR valve.

According to a ninth aspect of the invention, in any one of the first to fourth aspects, the exhaust gas recirculation apparatus of an internal combustion engine also includes fresh air intake amount measuring means for measuring an amount of fresh air drawn into the internal combustion engine. Moreover, the EGR gas amount changing means includes a low pressure EGR valve which is provided in the low pressure EGR passage and adjusts a passage sectional area of the low pressure EGR passage, and a high pressure EGR valve which is provided in the high pressure EGR passage and adjusts a passage sectional area of the high pressure EGR passage. During deceleration of a vehicle or when the internal combustion engine is idling, the low pressure EGR valve and the high pressure EGR valve are simultaneously opened and closed within a predetermined opening amount range and the relationship between the amounts of EGR gas flowing through the low pressure EGR passage and the high pressure EGR passage and the opening amounts of the low pressure EGR valve and the high pressure EGR valve is learn corrected based on the fresh air intake amount of the internal combustion engine at this time.

The variation in the amount of EGR gas supplied in the entire EGR system can be learn corrected by simultaneously opening and closing the low pressure EGR valve and the high pressure EGR valve. If the amount of EGR gas supplied can be optimized for the overall EGR apparatus, the production of NOx can be suppressed. The opening amounts of the low pressure EGR valve and the high pressure EGR valve at this time may be the same or changed while maintaining a predetermined correlation.

A tenth aspect of the invention relates to a control method of an exhaust gas recirculation apparatus that includes a turbocharger provided with a turbine in an exhaust passage and a compressor in an intake passage, a low pressure EGR passage which connects the exhaust passage downstream of the turbine with the intake passage upstream of the compressor, a high pressure EGR passage which connects the exhaust passage upstream of the turbine with the intake passage downstream of the compressor, and an exhaust gas control catalyst provided in the exhaust passage downstream of the turbine and upstream of the low pressure EGR passage. This control method includes the step of simultaneously changing amounts of EGR gas flowing through the low pressure EGR passage and the high pressure EGR passage such that a temperature of the exhaust gas control catalyst is within a target range.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, an exhaust gas recirculation apparatus of an internal combustion engine of the invention will be described in more detail in terms of exemplary embodiments.

Figure 1:
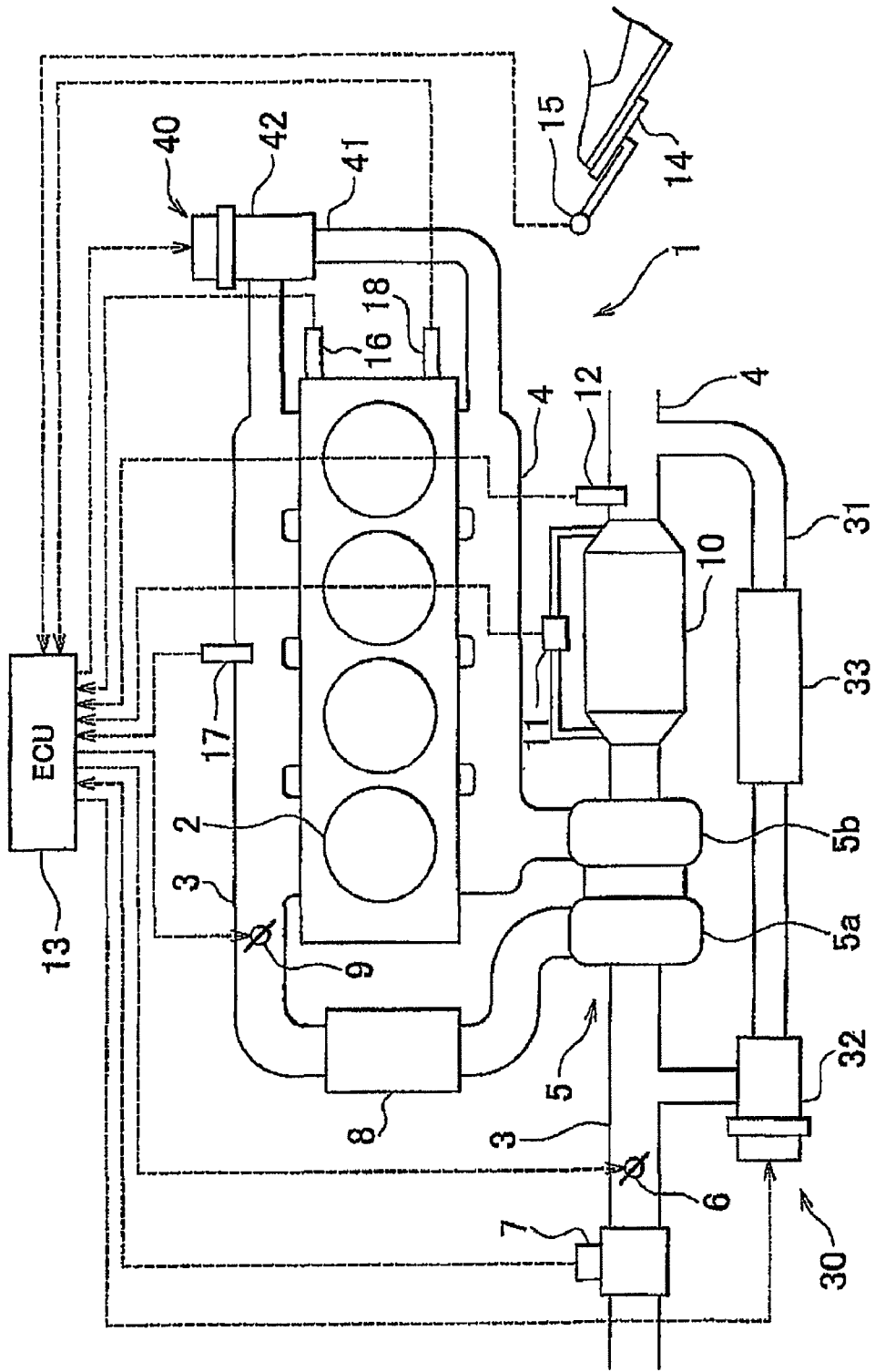
FIG. 1 is a diagram schematically showing the structure of both an internal combustion engine to which an exhaust gas recirculation apparatus of an internal combustion engine according to a first example embodiment of the invention is applied, the intake and exhaust systems of that internal combustion engine.

FIG. 1 is a diagram schematically showing the structure of both an internal combustion engine to which an exhaust gas recirculation apparatus of an internal combustion engine according to a first example embodiment of the invention is applied, the intake and exhaust systems of that internal combustion engine. The internal combustion engine 1 shown in the drawing is a water-cooled four cycle diesel engine with four cylinders 2.

An intake pipe 3 and an exhaust pipe 4 are connected to the internal combustion engine 1. A compressor housing 5a of a turbocharger 5 which is driven by the energy of the exhaust gas is provided midway in the intake pipe 3. Also, a first throttle 6 that adjusts the flowrate of intake air flowing through the intake pipe 3 is provided in the intake passage 3 upstream of the compressor housing 5a. This first throttle 6 is selectively opened and closed by an electric actuator. An airflow meter 7 that outputs a signal indicative of the flowrate of intake air flowing through the intake pipe 3 is provided in the intake pipe 3 upstream of the first throttle 6. This airflow meter 7 measures the amount of air drawn into the internal combustion engine 1. In this example embodiment, the airflow meter 7 corresponds to fresh air intake amount measuring means in the invention.

An intercooler 8 that performs heat exchange between the intake air and outside air is provided in the intake pipe 3 downstream of the compressor housing 5a. A second throttle 9 that adjusts the flowrate of intake air flowing through the intake pipe 3 is provided in the intake pipe 3 downstream of the intercooler 8. This second throttle 9 is selectively opened and closed by an electric actuator.

Meanwhile, a turbine housing 5b of the turbocharger 5 is provided midway in the exhaust pipe 4. Also, a particulate filter (hereinafter simply referred to as "filter") 10 is provided in the exhaust pipe 4 downstream of the turbine housing 5b. This filter 10 carries a NOx storage reduction catalyst (hereinafter simply referred to as "NOx catalyst") and traps particulate matter in the exhaust gas. Also, the NOx catalyst stores oxides of nitrogen (NOx) in the exhaust gas when the oxygen content of the exhaust gas flowing into the NOx catalyst is high, and releases stored NOx when the oxygen content of the exhaust gas flowing into the NOx catalyst decreases. At this time, if there is a reducing component such as hydrocarbon (HC) or carbon monoxide (CO) in the exhaust gas, NOx released from the NOx catalyst is reduced.

A differential pressure sensor 11 that measures the pressure difference between the pressures upstream and downstream of the filter 10 is mounted to the filter 10. The amount of particulate matter (hereinafter also referred to simply as "PM") accumulated in the filter 10 can be detected by this differential pressure sensor 11. Also, an exhaust gas temperature sensor 12 that detects the temperature of exhaust gas flowing through the exhaust pipe 4 is mounted to the exhaust pipe 4 downstream of the filter 10. The temperature of the filter 10 can be measured by this exhaust gas temperature sensor 12. A sensor that directly measures the temperature of the filter 10 may also be mounted to the filter 10.

The internal combustion engine 1 is also provided with a low pressure EGR system 30 that recirculates some of the exhaust gas flowing through the exhaust pipe 4 to the intake pipe 3 at a low pressure. This low pressure EGR system 30 includes a low pressure EGR passage 31, a low pressure EGR valve 32, and an EGR cooler 33. The low pressure EGR passage 31 connects the exhaust pipe 4 downstream of the filter 10 to the intake pipe 3 upstream of the compressor housing 5a and downstream of the first throttle 6. Exhaust gas is recirculated at a low pressure through this low pressure EGR passage 31. In this example embodiment, the exhaust gas that is recirculated through this low pressure EGR passage 31 will be referred to as low pressure EGR gas. Also, the low pressure EGR valve 32 adjusts the amount of low pressure EGR gas flowing through this low pressure EGR passage 31 by adjusting the passage sectional area of the low pressure EGR passage 31. Further, the EGR cooler 33 reduces the temperature of the low pressure EGR gas by performing heat exchange between the low pressure EGR gas flowing through the EGR cooler 3 and coolant in the internal combustion engine 1.

In addition, the internal combustion engine 1 is also provided with a high pressure EGR system 40 that recirculates some of the exhaust gas flowing through the exhaust pipe 4 to the intake pipe 3 at a high pressure. This high pressure EGR system 40 includes a high pressure EGR passage 41 and a high pressure EGR valve 42. The high pressure EGR passage 41 connects the exhaust pipe 4 upstream of the turbine housing 5b to the intake pipe 3 downstream of the second throttle 9. Exhaust gas is recirculated at a high pressure through this high pressure EGR passage 41. In this example embodiment, the exhaust gas that is recirculated through this high pressure EGR passage 41 will be referred to as high pressure EGR gas. Also, the high pressure EGR valve 42 adjusts the amount of high pressure EGR gas flowing through this high pressure EGR passage 41 by adjusting the passage sectional area of the high pressure EGR passage 41.

The internal combustion engine 1 having the foregoing structure is also provided with an ECU 13 which is an electronic control unit for controlling the internal combustion engine 1. This ECU 13 is a unit that controls the operating state of the internal combustion engine 1 according to operating conditions of the internal combustion engine 1 and demands from a driver. Also, the ECU 13 is connected to various sensors via electric lines. These sensors include, in addition to the sensors described above, an accelerator depression amount sensor 15 which can detect an engine load and outputs a signal indicative of the amount an accelerator pedal 14 is being depressed by the driver, a crank position sensor 16 that detects the engine speed, an intake air pressure sensor 17 that detects the pressure of intake air downstream of the second throttle 9, and a coolant temperature sensor 18 that detects the temperature of coolant in the internal combustion engine 1. Output signals from these various sensors are input to the ECU 13. Meanwhile, the ECU 13 is also connected via electric lines to the first throttle 6, the second throttle 9, the low pressure EGR valve 32, and the high pressure EGR valve 42, which are all controlled by the ECU 13.

In this example embodiment, when the supply of fuel is stopped during deceleration of the vehicle, for example, the opening amounts of the low pressure EGR valve 32 and the high pressure EGR valve 42 change based on the temperature of the filter 10. The temperature of the filter 10 at this time is obtained by the exhaust gas temperature sensor 12.

Here, when the opening amount of the high pressure EGR valve 42 is increased, the amount of fresh air drawn into the internal combustion engine 1 decreases. As a result, the amount of exhaust gas passing through the filter 10 decreases. When the vehicle is decelerating, a fuel cut is performed so the temperature of the exhaust gas flowing through the filter 10 is low but the amount of that exhaust gas is less, which enables a decrease in temperature of the filter 10 is able to be suppressed.

In contrast, when the opening amount of the high pressure EGR valve 42 is reduced, the amount of fresh air increases so the amount of exhaust gas that flows through the filter 10 increases. As a result, the temperature of the filter 10 drops.

Thus, in this example embodiment, when it is preferable to suppress a decrease in the temperature of the filter 10 while the vehicle is decelerating, the opening amount of the high pressure EGR valve 42 is increased during deceleration of the vehicle. Also, when it is preferable to lower the temperature of the filter 10 while the vehicle is decelerating, the opening amount of the high pressure EGR valve 42 is reduced during deceleration of the vehicle.

If when attempting to suppress a decrease in the temperature of the filter 10 the opening amount of the high pressure EGR valve 42 is increased too much, the amount of exhaust gas that passes through the turbine housing 5b may decrease, which may slow an increase in boost pressure during the next acceleration. With regard to this point, a decrease in the amount of exhaust gas passing through the turbine housing 5b can be suppressed by increasing the opening amount of the low pressure EGR valve 32 to increase the amount of low pressure EGR gas that is supplied. The opening amount of the high pressure EGR valve 42 can then be reduced a corresponding amount. This also enables relatively high temperature EGR gas that has passed through the filter 10 to be supplied, which in turn also makes it possible to suppress a decrease in the temperature of the filter 10.

Figure 2:
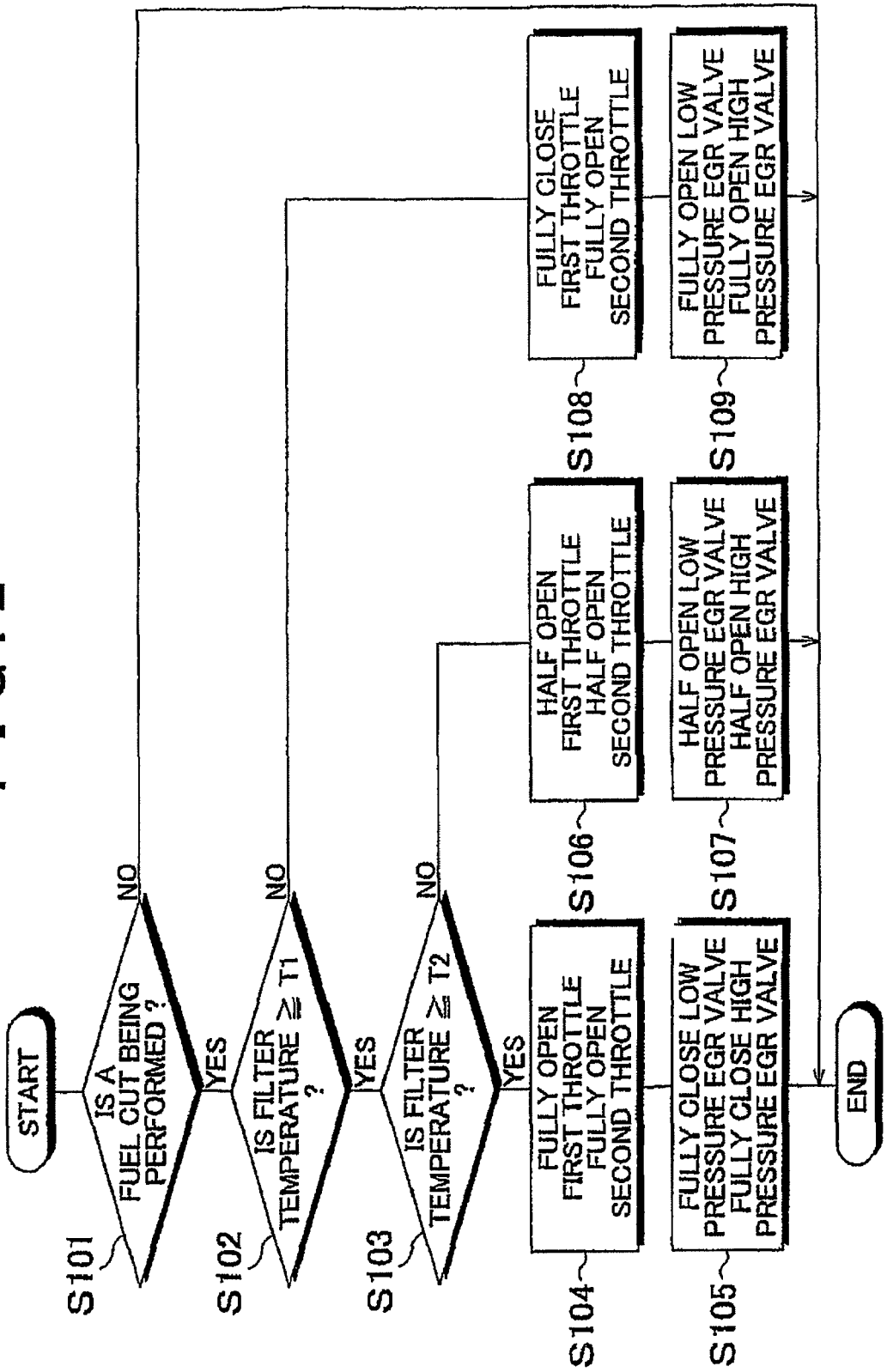
FIG. 2 is a flowchart illustrating a routine for controlling the opening amounts of a low pressure EGR valve and a high pressure EGR valve according to the first example embodiment of the invention.

Next, a routine for controlling the opening amounts of the low pressure EGR valve 32 and the high pressure EGR valve 42 according to this example embodiment will be described. FIG. 2 is a flowchart illustrating a routine for controlling the opening amounts of the low pressure EGR valve 32 and the high pressure EGR valve 42 according to this example embodiment. This routine is repeatedly executed at predetermined intervals of time. In this example embodiment, it will be assumed that the temperature of the filter 10 and the temperature of the NOx catalyst are equal.

In step S101, it is determined whether a fuel cut is being performed. When a fuel cut is being performed, the supply of fuel is stopped while the internal combustion engine 1 is running. If the determination in step S101 is Yes, the process proceeds on to step S102. If, on the other hand, the determination is No, this cycle of the routine ends.

In step S102, it is determined whether the temperature of the filter 10 is equal to or less than a predetermined temperature T1. This predetermined temperature T1 is a lower limit value of a temperature at which the NOx catalyst can be kept activated. This predetermined temperature T1 may also be the lower limit of a target range of the NOx catalyst temperature. If the determination in step S102 is Yes, the process proceeds on to step S103. If, on the other hand, the determination is No, the process proceeds on to step S108.

In step S103, it is determined whether the temperature of the filter 10 is equal to or greater than a predetermined temperature T2. This predetermined temperature T2 is a temperature that is higher than the predetermined temperature T1 and is a lower limit value of a temperature at which there is a possibility of the filter 10 overheating during a fuel cut. This predetermined temperature T2 may also be a value exceeding the target range of the NOx catalyst temperature. If the determination in step S103 is Yes, the process proceeds on to step S104. If, on the other hand, the determination is No, the process proceeds onto step S106.

In step S104, the first throttle 6 and the second throttle 9 are fully opened. As a result, the amount of intake air in the internal combustion engine 1 increases so the amount of exhaust gas that passes through the filter 10 can also be increased. While the vehicle is decelerating, the temperature of the exhaust gas drops so more low temperature exhaust gas is able to pass through the filter 10. As a result, the temperature of the filter 10 drops so that it approaches the target range. In this way, this step increases the amount of exhaust gas to suppress the filter 10 from overheating.

In step S105, the low pressure EGR valve 32 and the high pressure EGR valve 42 are fully closed. As a result, both low pressure EGR gas and high pressure EGR gas stop flowing so low temperature exhaust gas during the fuel cut can be supplied to the filter 10. Accordingly, the temperature of the filter 10 drops so that it approaches the target range. Also, the exhaust gas stops flowing into the high pressure EGR passage 41 so the amount of exhaust gas flowing through the turbine housing 5b increases. As a result, the speed of the turbocharger 5 is able to be suppressed from falling below a target range.

In step S106, the first throttle 6 and the second throttle 9 are opened halfway. As a result, appropriate amounts of low pressure EGR gas and high pressure EGR gas are allowed to through. The opening amounts of the first throttle 6 and the second throttle 9 may also be set to optimal values obtained in advance through testing or the like. The optimal values at this time are, for example, values necessary to both maintain the temperature of the filter 10 within the target range and maintain the speed of the turbocharger 5 within the target range.

In step S107, the low pressure EGR valve 32 and the high pressure EGR valve 42 are opened halfway. As a result, appropriate amounts of low pressure EGR gas and high pressure EGR gas are allowed to flow through, thus enabling a decrease in temperature of the filter 10 to be suppressed. Also, the temperature of the filter 10 is inhibited from dropping below the target range. The opening amounts of the low pressure EGR valve 32 and the high pressure EGR valve 42 may also be set to optimal values obtained in advance through testing or the like. The optimal values at this time are, for example, values necessary to both maintain the temperature of the filter 10 within the target range and maintain the speed of the turbocharger 5 within the target range.

In step S108, the first throttle 6 is fully closed and the second throttle 9 is fully opened. That is, the amount of fresh air that is drawn in is reduced in order to suppress a decrease in the temperature of the filter 10 due to low temperature exhaust gas flowing into the filter 10 during a fuel cut. Also, fully closing the first throttle 6 reduces the pressure in the intake pipe 3 which enables the amounts of low pressure EGR gas and high pressure EGR gas that are supplied to be increased. In this way, it is possible to inhibit the temperature of the filter 10 from going outside of the target range.

In step S109, the low pressure EGR valve 32 and the high pressure EGR valve 42 are fully opened. That is, increasing the amounts of low pressure EGR gas and high pressure EGR gas supplied suppresses a decrease in temperature of the filter 10 while also suppressing a decrease in speed of the turbocharger 5. As a result, the speed of the turbocharger 5 is able to be kept within the target range. Or, if the speed of the turbocharger 5 falls below the target range, the speed of the turbocharger 5 can be inhibited from decreasing further. In this example embodiment, the ECU 13 which executes the routine shown in FIG. 2 corresponds to EGR gas amount changing means.

Accordingly, when the temperature of the filter 10 is within the target range or below the target range, the temperature of the filter 10 can be suppressed from dropping. As a result, the purification efficiency of the NOx catalyst can be further improved. On the other hand, when the temperature of the filter 10 is above the target range, the temperature of the filter 10 can be lowered so that the filter 10 or the NOx catalyst can be inhibited from overheating.

Even if a fuel cut is being performed, a decrease in the speed of the turbocharger 5 can be suppressed so that the boost pressure can be increased quickly during the next acceleration.

In a second example embodiment, the opening amounts of the first throttle 6 and the second throttle 9 in step S106 and the opening amounts of the low pressure EGR valve 32 and the high pressure EGR valve 42 in step S107 are changed based on the temperature of the filter 10. All else is the same as in the first example embodiment so descriptions thereof will be omitted.

Figure 3:
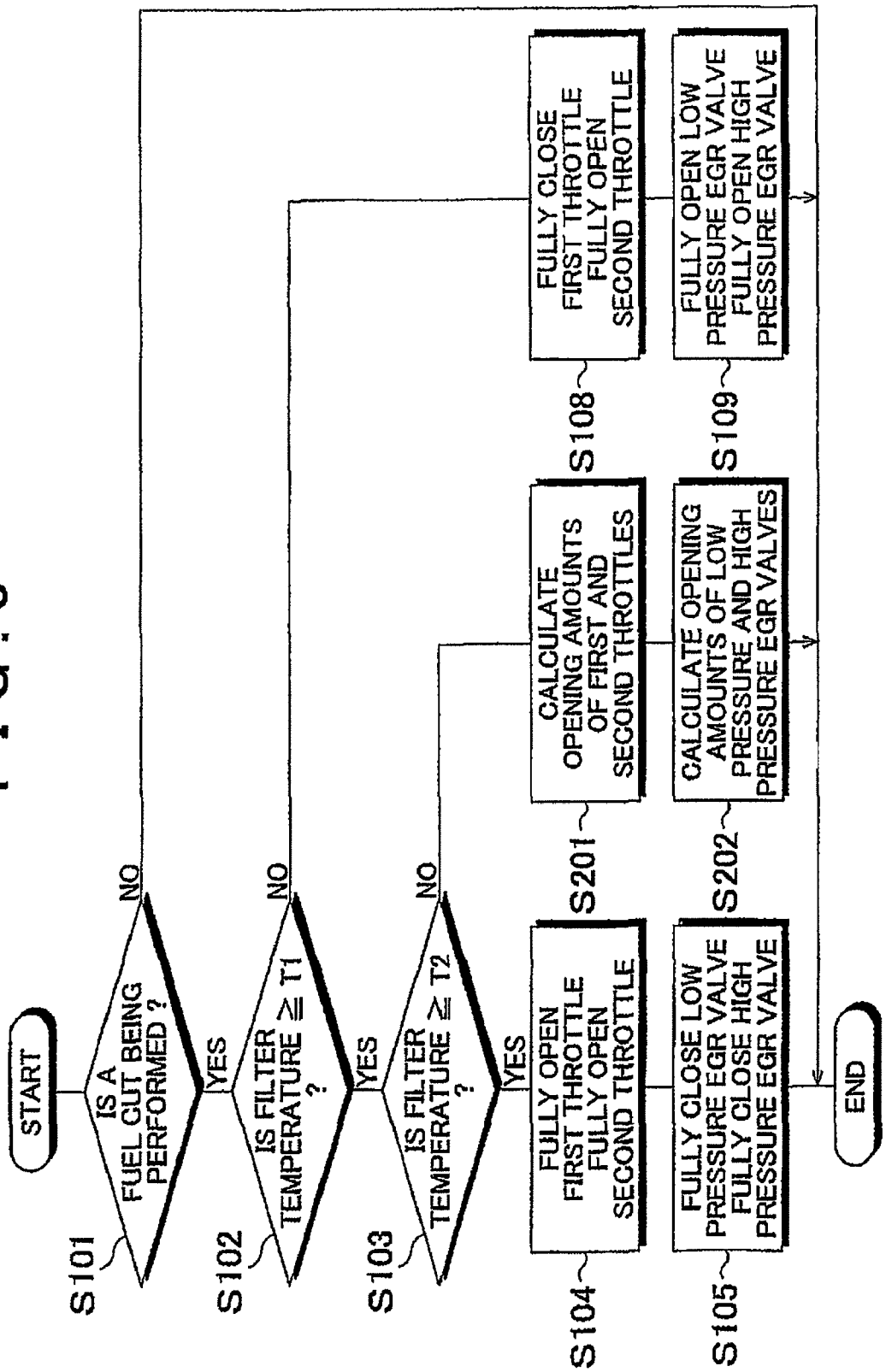
FIG. 3 is a flowchart illustrating a routine for controlling the opening amounts of the low pressure EGR valve and the high pressure EGR valve according to a second example embodiment of the invention.

FIG. 3 is a flowchart illustrating a routine for controlling the opening amounts of the low pressure EGR valve 32 and the high pressure EGR valve 42 according to the second example embodiment. Steps in this flowchart that are the same as steps in the flowchart described above will be denoted by the same step numbers and descriptions there of will be omitted.

In step S201, the opening amounts of the first throttle 6 and the second throttle 9 are calculated.

Figure 4:
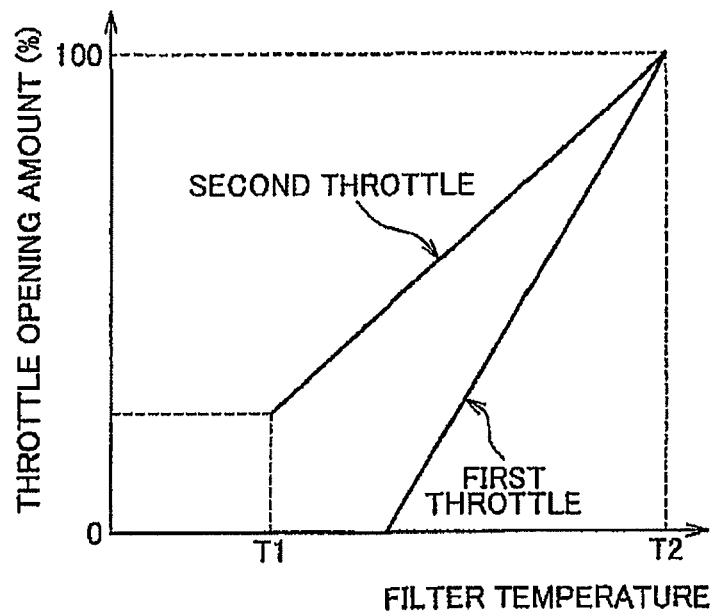
FIG. 4 is a graph showing the relationship between the temperature of a filter and the opening amounts of a first throttle and a second throttle.

FIG. 4 is a graph showing the relationship between the temperature of the filter 10 and the opening amounts of the first throttle 6 and the second throttle 9. The opening amounts of the first throttle 6 and the second throttle 9 are increased the higher the temperature of the filter 10. Also, the opening amount of the second throttle 9 is increased more than the opening amount of the first throttle 6. The opening amounts of the first throttle 6 and the second throttle 9 at this time are, for example, values necessary to both keep the temperature of the filter 10 within the target range and keep the speed of the turbocharger 5 within the target range. When it is difficult to simultaneously keep both the temperature of the filter 10 and the speed of the turbocharger 5 within their respective target ranges, priority may be given to one and the opening amounts of the first throttle 6 and the second throttle 9 may be determined to keep that selected one within its target range.

Also, as shown in FIG. 4, when the temperature of the filter 10 is the predetermined temperature T1, the second filter 9 is not fully closed to ensure to some degree the speed of the turbocharger 5. In this way, the pressure inside the intake pipe 3 and the amount of exhaust gas that flows into the filter 10 are adjusted.

In step S202 the opening amounts of the low pressure EGR valve 32 and the high pressure EGR valve 42 are calculated.

Figure 5:
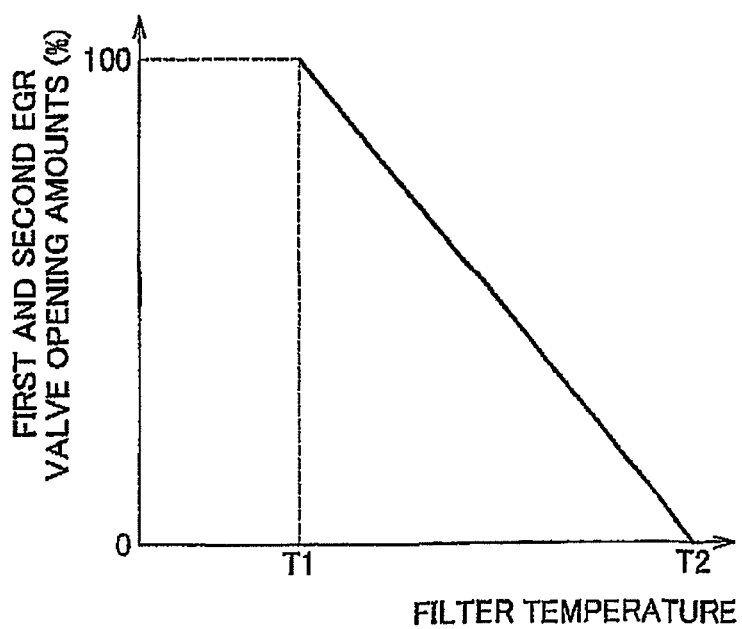
FIG. 5 is a graph showing the relationship between the temperature of the filter and the opening amounts of the low pressure EGR valve and the high pressure EGR valve.

FIG. 5 is a graph showing the relationship between the temperature of the filter 10 and the opening amounts of the low pressure EGR valve 32 and the high pressure EGR valve 42. The opening amounts of the low pressure EGR valve 32 and the high pressure EGR valve 42 are reduced to reduce the amount of EGR as the temperature of the filter 10 becomes higher.

As a result, appropriate amounts of low pressure EGR gas and high pressure EGR gas pass through, thereby enabling a decrease in temperature of the filter 10 to be suppressed so the temperature of the filter 10 is able to be suppressed from dropping below the target range. The opening amounts of the low pressure EGR valve 32 and the high pressure EGR valve 42 are, for example, values that are necessary to both keep the temperature of the filter 10 within the target range and keep the speed of the turbocharger 5 within the target range. When it is difficult to simultaneously keep both the temperature of the filter 10 and the speed of the turbocharger within their respective target ranges, priority may be given to one and the opening amounts of the low pressure EGR valve 32 and the high pressure EGR valve 42 may be determined to keep that selected one within its target range.

In this example embodiment, the ECU 13 that executes the routine shown in FIG. 3 corresponds to EGR gas amount changing means.

In this way, when the temperature of the filter 10 is equal to or greater than the predetermined temperature T1 and less than the predetermined temperature T2, EGR gas corresponding to the temperature of the filter 10 at that time can be supplied. As a result, the temperature of the filter 10 can be kept within the target range.

Also, even if a fuel cut is being performed, a decrease in speed of the turbocharger 5 is able to be suppressed so the boost pressure can be increased quickly during the next acceleration.

In a third example embodiment, the opening amounts of the low pressure EGR valve 32 and the high pressure EGR valve 42 are learn corrected. All else is the same as in the first example embodiment so descriptions thereof will be omitted.

The relationship between the opening amounts of the low pressure EGR valve 32 and the high pressure EGR valve 42, and the amount of EGR gas supplied to the cylinders 2 changes depending on, for example, the amount of soot adhered to the EGR passages and EGR valves. Therefore, when the amount of EGR gas is controlled by the opening amounts of the low pressure EGR valve 32 and the high pressure EGR valve 42, the opening amounts of the low pressure EGR valve 32 and the high pressure EGR valve 42 must be corrected by an amount corresponding to the amount of change in the amount of EGR gas. Therefore, in this example embodiment, the intake air amount which correlates to the EGR gas amount is detected and the opening amounts of the low pressure EGR valve 32 and the high pressure EGR valve 42 are learn corrected based on this intake air amount.

In this example embodiment, when a fuel cut is being performed while the vehicle is decelerating or when the internal combustion engine 1 is idling, the low pressure EGR valve 32 and the high pressure EGR valve 42 are opened and closed and the relationship between the opening amounts of the low pressure EGR valve 32 and the high pressure EGR valve 42, and the intake air amount is learned. Also, these values when the engine is new are stored in advance in the ECU 13. These stored values are then compared with the learned values, and the difference is considered to be due to the affect from soot and the like adhered to the EGR passages and EGR valves. The magnitude of the effect from soot and the like is then added to the preset opening amounts of the low pressure EGR valve 32 and the high pressure EGR valve 42. Accordingly, the amount of EGR gas thereafter can be made appropriate.

Figure 6:
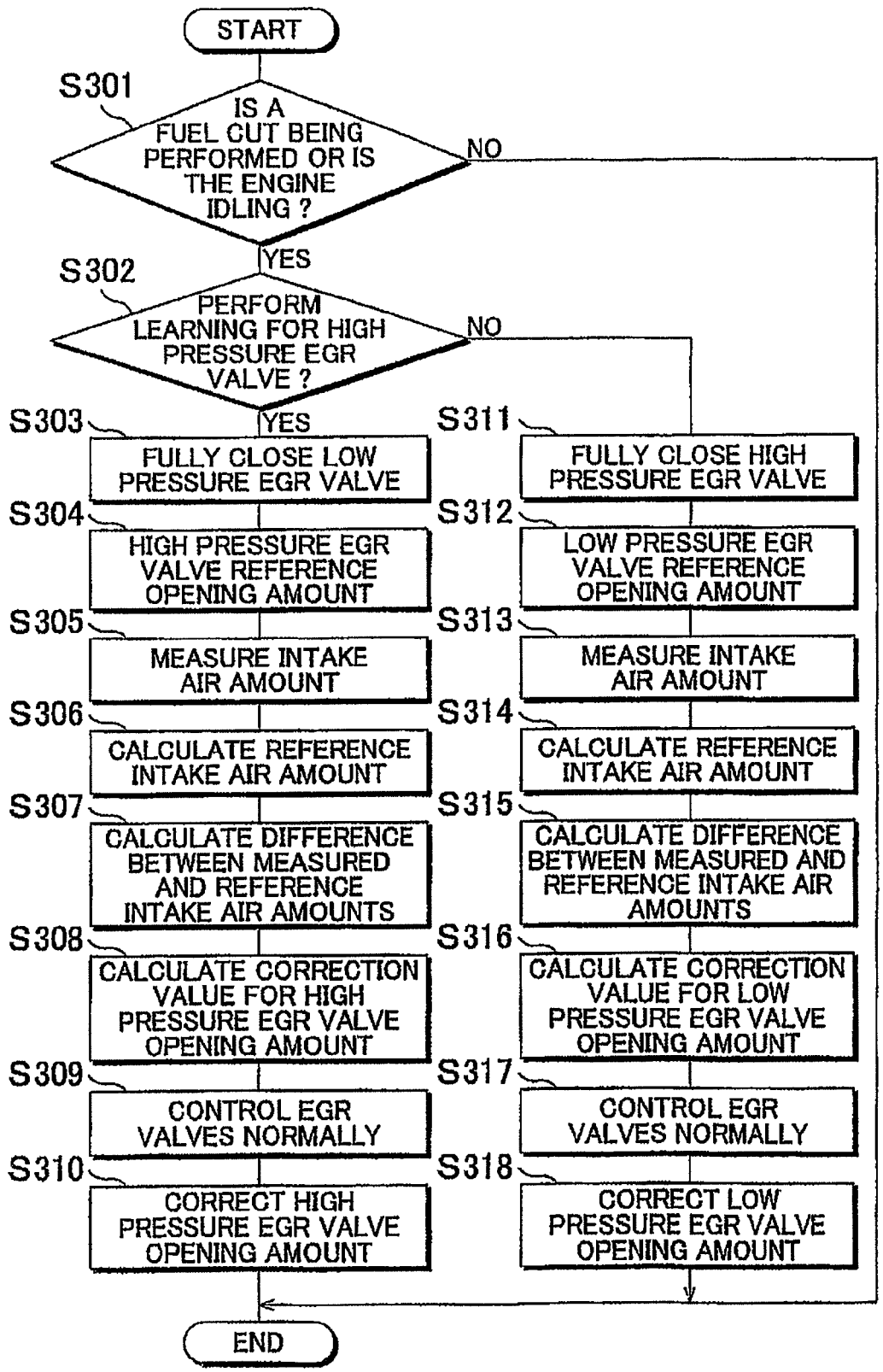
FIG. 6 is a flowchart illustrating a routine for learning control of the low pressure EGR valve and the high pressure EGR valve according to a third example embodiment of the invention.

Next, the routine of the control for learning the opening amounts of the low pressure EGR valve 32 and the high pressure EGR valve 42 according to this example embodiment will be described. FIG. 6 is a flowchart illustrating the routine of this learning control for the opening amounts of the low pressure EGR 32 and the high pressure EGR valve 42 according to this example embodiment. This routine is repeatedly executed at predetermined intervals of time.

In step S301, it is determined whether a fuel cut is being performed or whether the internal combustion engine is idling. That is, it is determined whether it is an appropriate time to learn the opening amounts of the low pressure EGR valve 32 and the high pressure EGR valve 42. If the determination in step S301 is Yes, then the process proceeds on to step S302. If, on the other hand, the determination is No, then this cycle of the routine ends.

In step S302 it is determined whether to perform learning for the high pressure EGR valve 42. This determination is made such that learning is performed in order for the low pressure EGR valve 32 and the high pressure EGR 42, for example. If the determination in step S302 is Yes, the process proceeds on to step S303. If, on the other hand, the determination is No, the process proceeds on to step S311.

In step S303, the low pressure EGR valve 32 is fully closed. As a result, exhaust gas is prevented from flowing into the low pressure EGR passage 31. That is, the intake air amount is no longer affected by the low pressure EGR gas, only by the high pressure EGR gas. Therefore, the affect from soot and the like that is adhered to the high pressure EGR passage 41 and the high pressure EGR valve 42 can be obtained as the amount of change in the intake air amount.

In step S304, the high pressure EGR valve 42 is fixed at a reference opening amount at the time of learning. This reference amount may be fully open, for example.

In step S305, the intake air amount is measured. The intake air amount can be obtained by the airflow meter 7. The intake air amount obtained at this time will be referred to as the measured intake air amount.

In step S306, the intake air amount which is to be the reference (i.e., the reference intake air amount) is calculated from the engine speed. The reference intake air amount is the intake air amount that can be detected by the airflow meter 7 when the high pressure EGR valve 42 is at the reference opening amount and no soot or the like is adhered to the high pressure EGR passage 41 or the high pressure EGR valve 42. The relationship between the engine speed and the reference intake air amount is obtained in advance through testing or the like and mapped, and then stored in the ECU 13.

In step S307, the difference between the measured intake air amount and the reference intake air amount is calculated. The difference in the calculated intake air amount at this time has a correlation with the amount of high pressure EGR gas changed by soot and the like adhered to the high pressure EGR passage 41 and the high pressure EGR valve 42.

In step S308, a correction value of the high pressure EGR valve 42 for the difference calculated in step S307 is calculated. The relationship between the difference calculated in step S307 and the correction value is obtained in advance through testing or the like and mapped, and then stored in the ECU 13. The correction value is determined such that the opening amount of the high pressure EGR valve 42 increases the greater the difference calculated in step S307.

In step S309, learning for the high pressure EGR valve 42 ends and the opening amounts of the low pressure EGR valve 32 and the high pressure EGR valve 42 are returned to their normal values.

In step S310, the high pressure EGR valve 42 is opened an amount corresponding to the reference opening amount plus the correction value.

In this way, the opening amount of the high pressure EGR valve 42 is learn corrected. A learning correction is then carried out for the low pressure EGR valve 32 in a similar fashion in steps S311 to S318. For this, all that need be done is to use the low pressure EGR valve 32 instead of the high pressure EGR valve 42 and use the low pressure EGR passage 31 instead of the high pressure EGR passage 42 in steps S303 to S310 so descriptions of the processes of steps S311 to S318 in this case will be omitted here. In this way, the opening amount of the low pressure EGR valve 32 can also be learn corrected.

As described above, according to this example embodiment, the opening amounts of the low pressure EGR valve 32 and the high pressure EGR valve 42 can be learn corrected, which enables the amount of EGR gas supplied to the cylinders 2 to be made appropriate.

In a fourth example embodiment of the invention, when learn correcting the opening amounts of the low pressure EGR valve 32 and the high pressure EGR valve 42, a correction based on the temperature of the filter 10 or the cooling efficiency of the EGR cooler 33 is also added. All else is the same as in the foregoing example embodiments so descriptions thereof will be omitted.

Here, a change in the temperature of the filter 10 results in a change in the volume flowrate of exhaust gas flowing through the filter 10. Also, a change in the cooling efficiency of the EGR cooler 33 results in a change in the volume flowrate of the exhaust gas flowing through the EGR cooler 33. Based on these facts, the relationship between the opening amounts of the low pressure EGR valve 32 and the high pressure EGR valve 42, and the amount of EGR gas supplied to the cylinders 2 also changes. In addition, the relationship between the intake air amount detected by the airflow meter 7 and the EGR gas amount also changes. Therefore, when learn correcting the opening amounts of the low pressure EGR valve 32 and the high pressure EGR valve 42 based on the difference between the intake air amount detected by the airflow meter 7 and the reference intake air amount, the correction value changes depending on the temperature of the filter 10 or the cooling efficiency of the EGR cooler 33.

With regard to this point, the correction is able to be even more accurate by learn correcting the opening amounts of the low pressure EGR valve 32 and the high pressure EGR valve 42 taking into account the temperature of the filter 10 or the cooling efficiency of the EGR cooler 33.

For example, the temperature of the filter 10 that is to be the reference is set in advance as the "reference filter temperature" according to the operating state of the internal combustion engine 1 and the difference between the temperature of the filter 10 obtained by the exhaust gas temperature sensor 12 and the reference filter temperature is calculated. A correction value of the opening amounts of the low pressure EGR valve 32 and the high pressure EGR valve 42 for this difference is obtained in advance through testing or the like and mapped, and then stored in the ECU 13. A learning correction can then be made that takes the temperature of the filter 10 into account by further adding the correction value obtained from this map to the opening amounts of the low pressure EGR valve 32 and the high pressure EGR valve 42 after the correction obtained from the third example embodiment.

Also, because the cooling efficiency of the EGR cooler 33 correlates with the coolant temperature, the opening amount of the low pressure EGR valve 32 can also be learn corrected according to the coolant temperature. For example, the coolant temperature that is to be the reference is set in advance as the "reference coolant temperature" according to the operating state of the internal combustion engine 1 and the difference between the coolant temperature obtained by the coolant temperature sensor 18 and this reference coolant temperature is calculated. A correction value of the opening amount of the low pressure EGR valve 32 for this difference is obtained in advance through testing or the like and mapped, and then stored in the ECU 13. A learning correction can then be made that takes the cooling efficiency of the EGR cooler 33 into account by further adding the correction value obtained from this map to the opening amount of the low pressure EGR valve 32 after the correction obtained from the third example embodiment.

In a fifth example embodiment of the invention, when learn correcting the low pressure EGR valve 32 and the high pressure EGR valve 42, a correction based on the amount of PM trapped in the filter 10 (or the degree to which the filter 10 is clogged) is added. All else is the same as in the foregoing example embodiments so descriptions thereof will be omitted.

A change in the amount of PM trapped in the filter 10 results in a change in the volume flowrate of exhaust gas flowing through the filter 10. Accordingly, the relationship between the opening amounts of the low pressure EGR valve 32 and the high pressure EGR valve 42, and the amount of EGR gas supplied to the cylinders 2 also changes. Therefore, a more accurate correction can be made by performing a learning correction taking the amount of PM trapped in the filter 10 into account.

Figure 7:
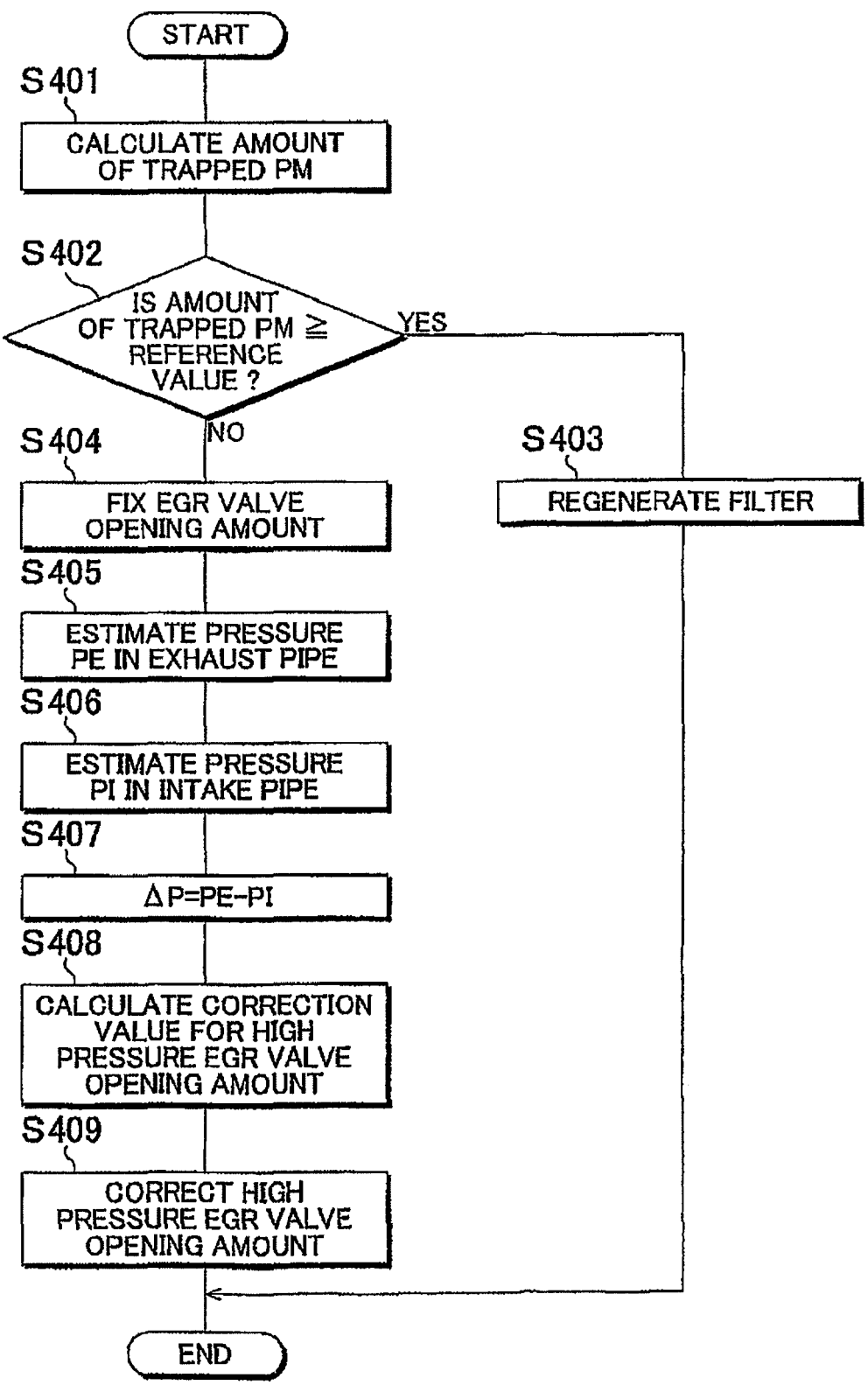
FIG. 7 is a flowchart illustrating a routine for learning control of the low pressure EGR valve and the high pressure EGR valve according to a fifth example embodiment of the invention.

Next, a routine for controlling the learning of the opening amounts of the low pressure EGR valve 32 and the high pressure EGR valve 42 according to this example embodiment will be described. FIG. 7 is a flowchart illustrating a learning control routine for the opening amounts of the low pressure EGR valve 32 and the high pressure EGR valve 42 according to this example embodiment. This routine is repeatedly executed at predetermined intervals of time.

In step S401, the amount of PM trapped in the filter 10 is calculated. The amount of PM trapped in the filter 10 can be obtained by first obtaining a trapped PM amount corresponding to a detection value of the differential pressure sensor 11 in advance through testing or the like and comparing that detection value with a detection value currently detected by the differential pressure sensor 11. Alternatively, the trapped PM amount corresponding to operating conditions (such as the exhaust gas temperature, the fuel injection quantity, and engine speed) of the internal combustion engine 1 can be obtained in advance through testing or the like and mapped, and the current amount of PM currently trapped in the filter 10 can be obtained by adding up the trapped PM amounts obtained from this map. Moreover, the amount of PM trapped in the filter 10 can be estimated according to the running distance or running time of the vehicle.

In step S402, it is determined whether the amount of PM trapped in the filter 10 is equal to or greater than a reference value. This reference value is a lower limit value of the trapped PM amount that requires the filter 10 to be regenerated. When the amount of PM trapped in the filter 10 is equal to or greater than the reference value, the accuracy of the learning control for the opening amounts of the low pressure EGR valve 32 and the high pressure EGR valve 42 declines. Therefore, the learning control is not performed. Instead, a process is performed to regenerate the filter 10. Thus, if the determination in step S402 is Yes, the process proceeds on to step S403. If the determination is No, on the other hand, the process proceeds on to step S404.

In step S403, a process to regenerate the filter 10 is performed. This regenerating process can be performed using conventional technology.

In step S404, the low pressure EGR valve 32 and the high pressure EGR 42 are each fixed at a predetermined opening amount. This predetermined opening amount is an opening amount that is set when the opening amounts of the low pressure EGR valve 32 and the high pressure EGR valve 42 are learned according to this example embodiment, and may be fully open, for example.

In step S405, a pressure PE in the exhaust pipe 4 upstream of the turbine housing 5b (i.e., on the internal combustion engine 1 side) is estimated. This pressure in the exhaust pipe 4 can be obtained based, for example, on the intake air amount and the pressure difference obtained by the differential pressure sensor 11. Also, a pressure sensor may be attached to the exhaust pipe 4 and the pressure directly measured.

In step S406, a pressure PI in the intake pipe 3 downstream of the second throttle 9 (i.e., on the internal combustion engine 1 side) is estimated. This pressure in the intake pipe 3 can be obtained by the intake air pressure sensor 17.

In step S407, a difference ΔP between the pressure PE in the exhaust pipe 4 calculated in step S405 and the pressure PI in the intake pipe 3 calculated in step S406 is calculated.

In step S408, a correction value of the opening amount of the high pressure EGR valve 42 is calculated. This correction value is calculated based on the difference between a reference value of the difference ΔP of the pressure calculated in step S407 and the difference ΔP of the pressure calculated in step S407. The correction value increases the greater this difference. The "reference value of the difference ΔP of the pressure calculated in step S407" is the value to which the opening amounts of the low pressure EGR valve 32 and the high pressure EGR valve 42 are set in step S404. Moreover, it is the difference between the pressure PI in the intake pipe 3 and the pressure PE in the exhaust pipe 4 obtained when no PM is trapped in the filter 10 under the current operating conditions of the internal combustion engine.

In step S409, the sum of the opening amount of the high pressure EGR valve 42 at the current point plus the correction value calculated in step S408 is made the new opening amount of the high pressure EGR valve 42, and the high pressure EGR valve 42 is then controlled to that opening amount.

Because the learning value of the opening amount of the high pressure EGR valve 42 can be corrected according to the amount of PM trapped in the filter 10 in this way, an appropriate correction is possible even if the volume flowrate of exhaust gas flowing through the filter 10 changes due to the effect from the amount of PM trapped in the filter 10. The learning value of the low pressure EGR valve 32 can also be corrected in a similar manner.

Also, when there is a large amount of PM trapped in the filter, a learning correction for the opening amounts of the low pressure EGR valve 32 and the high pressure EGR valve 42 is not performed, which means an accurate correction is possible.

In a sixth example embodiment of the invention, the opening amounts of the low pressure EGR valve 32 and the high pressure EGR valve 42 are changed simultaneously and learn corrected. All else is the same as in the foregoing example embodiments so detailed descriptions thereof will be omitted.

Changing simultaneously and learn correcting the opening amounts of the low pressure EGR valve 32 and the high pressure EGR valve 42 enables the variation in the total EGR gas supplied to the cylinders 2 to be learn corrected.

Figure 8:
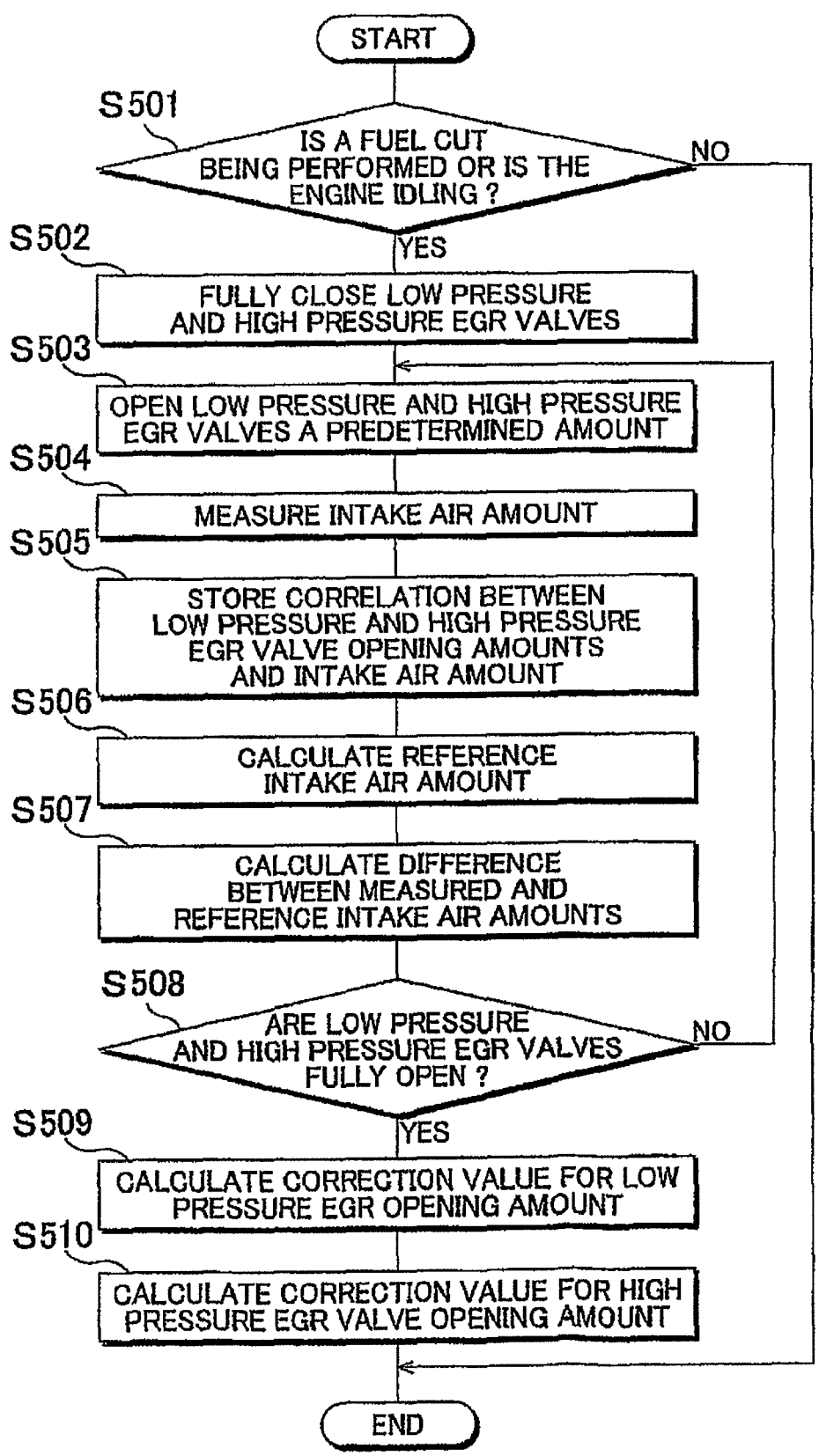
FIG. 8 is a flowchart illustrating a routine for learning control of the low pressure EGR valve and the high pressure EGR valve according to a sixth example embodiment of the invention.

Next, a routine for controlling learning of the opening amounts of the low pressure EGR valve 32 and the high pressure EGR valve 42 according to this example embodiment will be described. FIG. 8 is a flowchart illustrating the learning control of the opening amounts of the low pressure EGR valve 32 and the high pressure EGR valve 42 according to this example embodiment. This routine is repeatedly executed at predetermined intervals of time.

In step S501, it is determined whether a fuel cut is being performed or whether the internal combustion engine is idling. That is, it is determined whether the timing is appropriate to learn the opening amounts of the low pressure EGR valve 32 and the high pressure EGR valve 42. If the determination in step S501 is Yes, then the process proceeds on to step S502. If, on the other hand, the determination is No, then this cycle of the routine ends.

In step S502, the low pressure EGR valve 32 and the high pressure EGR valve 42 are fully closed. In this example embodiment, a learning correction is performed on the low pressure EGR valve 32 and the high pressure EGR valve 42 while changing the low pressure EGR valve 32 and the high pressure EGR valve 42 from fully closed to fully open in predetermined increments (i.e., predetermined opening amounts). This is why the low pressure EGR valve 32 and the high pressure EGR valve 42 are first fully closed.

In step S503, the low pressure EGR valve 32 and the high pressure EGR valve 42 are opened a predetermined amount.

In step S504, the intake air amount is measured. This intake air amount can be obtained by the airflow meter 7. The intake air amount obtained at this time is referred to as the measured intake air amount.

In step S505, the correlation between the intake air amount and the opening amounts of the low pressure EGR valve 32 and the high pressure EGR valve 42 is stored in the ECU 13. This value is stored for each predetermined opening amount of the low pressure EGR valve 32 and the high pressure EGR valve 42.

In step S506, the intake air amount that is to be the reference at this time (i.e., the reference intake air amount) is calculated from the engine speed and the opening amounts of the low pressure EGR valve 32 and the high pressure EGR valve 42. The relationship between the engine speed, the opening amounts of the low pressure EGR valve 32 and the high pressure EGR valve 42, and the reference intake air amount is obtained beforehand through testing or the like and mapped, and then stored in the ECU 13.

In step S507, the difference between the intake air amount stored in step S505 and the reference intake air amount calculated in step S506 is calculated. The difference in the intake air amount calculated at this time has a correlation with the amount of change in the sum of the low pressure EGR gas and the high pressure EGR gas. The value calculated in step S507 is stored in the ECU 13.

In step S508, it is determined whether the low pressure EGR valve 32 and the high pressure EGR valve 42 are fully open. That is, the opening amounts of the low pressure EGR valve 32 and the high pressure EGR valve 42 are changed from fully closed to fully open and it is determined whether the learning during that time is complete. If the determination in step S508 is Yes, the process proceeds on to step S509. If, on the other hand, the determination is No, the process proceeds on to step S503.

In step S509, the correction value of the opening amount of the low pressure EGR valve 32 is calculated based on the difference calculated in step S507. This correction value is calculated at each predetermined opening amount of the low pressure EGR valve 32. For example, the relationship between the correction value of the opening amount of the low pressure EGR valve 32 and the difference calculated in step S507 is obtained in advance and mapped. Also, the correction value at each predetermined opening amount is calculated. Correction values at other opening amounts can be calculated based on the correction values calculated at each predetermined opening amount. For example, an approximation having the low pressure EGR valve 32 as a parameter can be obtained based on the correction value obtained at each predetermined opening amount, and the correction value can be calculated by substituting another opening amount for that approximation.

In step S510, the correction value of the opening amount of the high pressure EGR valve 42 is calculated based on the difference calculated in step S507. The correction value of the opening of the high pressure EGR valve 42 can be calculated in the same way.

In this way, the opening amounts of the low pressure EGR valve 32 and the high pressure EGR valve 42 can be learn corrected simultaneously, which enables the total amount of EGR gas supplied to the cylinders 2 to be made more appropriate. Also, the variation in the amount of EGR gas due to manufacturing variation in the low pressure EGR valve 32 and the high pressure EGR valve 42 and the like can be corrected in advance.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A control method of an exhaust gas recirculation apparatus that includes a turbocharger provided with a turbine in an exhaust passage and a compressor in an intake passage, a low pressure EGR passage which connects the exhaust passage downstream of the turbine with the intake passage upstream of the compressor, a high pressure EGR passage which connects the exhaust passage upstream of the turbine with the intake passage downstream of the compressor, an exhaust gas control catalyst provided in the exhaust passage downstream of the turbine and upstream of the low pressure EGR passage, an electronic controller, and a catalytic temperature sensor, the method comprising:
sensing a catalytic temperature; and
simultaneously changing amounts of EGR gas flowing through the low pressure EGR passage and the high pressure EGR passage such that a temperature of the exhaust gas control catalyst is within a target range,
wherein when the temperature of the exhaust gas control catalyst is within the target range or below the target range, controlling the amounts of EGR gas flowing through the low pressure EGR passage and the high pressure EGR passage to be larger than the amounts of EGR gas flowing through the low pressure EGR passage and the high pressure EGR passage when the temperature of the exhaust gas control catalyst is above the target range.

2. The control method of an exhaust gas recirculation apparatus according to claim 1, wherein the amounts of EGR gas flowing through the low pressure EGR passage and the high pressure EGR passage are simultaneously changed when fuel has stopped being supplied.

3. The control method of an exhaust gas recirculation apparatus according to claim 1, wherein the amounts of EGR gas flowing through the low pressure EGR passage and the high pressure EGR passage are simultaneously changed to maintain a speed of the turbocharger.

4. The control method of an exhaust gas recirculation apparatus according to claim 1, wherein the amounts of EGR gas flowing through the low pressure EGR passage and the high pressure EGR passage are increased as the temperature of the exhaust gas control catalyst becomes lower.

5. The control method of an exhaust gas recirculation apparatus according to claim 1, further comprising:
measuring an amount of fresh air drawn into an internal combustion engine; and
opening a low pressure EGR valve which is provided in the low pressure EGR passage and adjusts a passage sectional area of the low pressure EGR passage and a high pressure EGR valve which is provided in the high pressure EGR passage and adjusts a passage sectional area of the high pressure EGR passage, a predetermined amount during deceleration of a vehicle or when the internal combustion engine is idling, and learn correcting at least one relationship, from among a relationship between the amount of EGR gas flowing through the low pressure EGR passage and the opening amount of the low pressure EGR valve and a relationship between the amount of EGR gas flowing through the high pressure EGR passage and the opening amount of the high pressure EGR valve, based on the fresh air intake amount of the internal combustion engine at this time.

6. The control method of an exhaust gas recirculation apparatus according to claim 5, further comprising learn correcting at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, based on the temperature of the exhaust gas control catalyst.

7. The control method of an exhaust gas recirculation apparatus according to claim 5, further comprising learn correcting at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, based on a cooling efficiency of an EGR cooler which is provided in at least one of the low pressure EGR passage and the high pressure EGR passage and reduces a temperature of the EGR gas.

8. The control method of an exhaust gas recirculation apparatus according to claim 5, further comprising learn correcting at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, based on an amount of particulate matter trapped in a particulate filter which carries an exhaust gas control catalyst and temporarily traps particulate matter in the exhaust gas.

9. The control method of an exhaust gas recirculation apparatus according to claim 8, wherein the learning correction is prohibited when the amount of particulate matter trapped in the particulate filter is equal to or greater than a predetermined amount.

10. The control method of an exhaust gas recirculation apparatus according to claim 1, further comprising:
measuring an amount of fresh air drawn into an internal combustion engine; and
opening and closing a low pressure EGR valve which is provided in the low pressure EGR passage and adjusts a passage sectional area of the low pressure EGR passage and a high pressure EGR valve which is provided in the high pressure EGR passage and adjusts a passage sectional area of the high pressure EGR passage, within a predetermined opening amount range simultaneously during deceleration of a vehicle or when the internal combustion engine is idling, and learn correcting a relationship between the amounts of EGR gas flowing through the low pressure EGR passage and the high pressure EGR passage and the opening amounts of the low pressure EGR valve and the high pressure EGR valve based on the fresh air intake amount of the internal combustion engine at this time.

11. An exhaust gas recirculation apparatus of an internal combustion engine, comprising:
a turbocharger provided with a turbine in an exhaust passage and a compressor in an intake passage;
a low pressure EGR passage which connects the exhaust passage downstream of the turbine with the intake passage upstream of the compressor;
a high pressure EGR passage which connects the exhaust passage upstream of the turbine with the intake passage downstream of the compressor;

an exhaust gas control catalyst provided in the exhaust passage downstream of the turbine and upstream of the low pressure EGR passage;

a catalytic temperature sensor; and an EGR gas amount controlling device which simultaneously changes amounts of EGR gas flowing through the low pressure EGR passage and the high pressure EGR passage such that a temperature of the exhaust gas control catalyst is within a target range, wherein when the temperature of the exhaust gas control catalyst is within the target range or below the target range, the EGR gas amount controlling device controls the amounts of EGR gas flowing through the low pressure EGR passage and the high pressure EGR passage to be larger than the amounts of EGR gas flowing through the low pressure EGR passage and the high pressure EGR passage when the temperature of the exhaust gas control catalyst is above the target range.

12. The exhaust gas recirculation apparatus of an internal combustion engine according to claim 11, wherein the EGR gas amount controlling device simultaneously changes the amounts of EGR gas flowing through the low pressure EGR passage and the high pressure EGR passage when fuel has stopped being supplied.

13. The exhaust gas recirculation apparatus of an internal combustion engine according to claim 11, wherein the EGR gas amount controlling device simultaneously changes the amounts of EGR gas flowing through the low pressure EGR passage and the high pressure EGR passage to maintain a speed of the turbocharger.

14. The exhaust gas recirculation apparatus of an internal combustion engine according to claim 11, wherein the amounts of EGR gas flowing through the low pressure EGR passage and the high pressure EGR passage are increased as the temperature of the exhaust gas control catalyst becomes lower.

15. The exhaust gas recirculation apparatus of an internal combustion engine according to claim 11, further comprising:

fresh air intake amount measuring device that measures an amount of fresh air drawn into the internal combustion engine, wherein the EGR gas amount controlling device includes a low pressure EGR valve which is provided in the low pressure EGR passage and adjusts a passage sectional area of the low pressure EGR passage, and a high pressure EGR valve which is provided in the high pressure EGR passage and adjusts a passage sectional area of the high pressure EGR passage, and during deceleration of a vehicle or when the internal combustion engine is idling, the low pressure EGR valve and the high pressure EGR valve are each opened a predetermined amount and the EGR gas amount controlling device learn corrects at least one relationship, from among a relationship between the amount of EGR gas flowing through the low pressure EGR passage and the opening amount of the low pressure EGR valve and a relationship between the amount of EGR gas flowing through the high pressure EGR passage and the opening amount of the high pressure EGR valve, corrected based on the fresh air intake amount of the internal combustion engine at this time.

16. The exhaust gas recirculation apparatus of an internal combustion engine according to claim 15, wherein the EGR gas amount controlling device learn corrects at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, corrected based on the temperature of the exhaust gas control catalyst.

17. The exhaust gas recirculation apparatus of an internal combustion engine according to claim 15, further comprising:

an EGR cooler which is provided in at least one of the low pressure EGR passage and the high pressure EGR passage and reduces the temperature of the EGR gas, wherein the EGR gas amount controlling device learn corrects at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, corrected based on a cooling efficiency of the EGR cooler.

18. The exhaust gas recirculation apparatus of an internal combustion engine according to claim 15, wherein the exhaust gas control catalyst is carried on a particulate filter that temporarily traps particulate matter in the exhaust gas, and the EGR gas amount controlling device learn corrects at least one relationship, from among the relationship between the amount of EGR gas flowing through the low pressure EGR passage and the opening amount of the low pressure EGR valve and the relationship between the amount of EGR gas flowing through the high pressure EGR passage and the opening amount of the high pressure EGR valve, based on the amount of particulate matter trapped in the particulate filter.

19. The exhaust gas recirculation apparatus of an internal combustion engine according to claim 18, wherein the learning correction is prohibited when the amount of particulate matter trapped in the particulate filter is equal to or greater than a predetermined amount.

20. The exhaust gas recirculation apparatus of an internal combustion engine according to claim 11, further comprising:

fresh air intake amount measuring device that measures an amount of fresh air drawn into the internal combustion engine, wherein the EGR gas amount controlling device includes a low pressure EGR valve which is provided in the low pressure EGR passage and adjusts a passage sectional area of the low pressure EGR passage, and a high pressure EGR valve which is provided in the high pressure EGR passage and adjusts a passage sectional area of the high pressure EGR passage, and during deceleration of a vehicle or when the internal combustion engine is idling, the low pressure EGR valve and the high pressure EGR valve are simultaneously opened and closed within a predetermined opening amount range and the EGR gas amount controlling device learn corrects the relationship between the amounts of EGR gas flowing through the low pressure EGR passage and the high pressure EGR passage and the opening amounts of the low pressure EGR valve and the high pressure EGR valve based on the fresh air intake amount of the internal combustion engine at this time.

\* \* \* \* \*